(12) United States Patent
Folkvang

(10) Patent No.: US 10,369,495 B2
(45) Date of Patent: *Aug. 6, 2019

(54) CLEANING OF OLEAGINOUS WATER III

(71) Applicant: Cameron Systems AS, Trondheim (NO)

(72) Inventor: Jorn Folkvang, Stathelle (NO)

(73) Assignee: Cameron Systems AS, Trondheim (NO)

( * ) Notice: Subject to any disclaimer, the term of this patent is extended or adjusted under 35 U.S.C. 154(b) by 356 days.

This patent is subject to a terminal disclaimer.

(21) Appl. No.: 14/802,765

(22) Filed: Jul. 17, 2015

(65) Prior Publication Data

US 2016/0008738 A1    Jan. 14, 2016

Related U.S. Application Data

(63) Continuation of application No. 13/143,941, filed as application No. PCT/NO2009/000224 on Jun. 16, 2009, now Pat. No. 9,808,741.

(30) Foreign Application Priority Data

Jan. 12, 2009  (NO) .................................. 20090176
Apr. 2, 2009   (NO) .................................. 20091364

(51) Int. Cl.
    *B01D 17/02*    (2006.01)
    *C02F 1/40*     (2006.01)
    (Continued)

(52) U.S. Cl.
    CPC ..... *B01D 17/0205* (2013.01); *B01D 17/0217* (2013.01); *B03D 1/1412* (2013.01);
    (Continued)

(58) Field of Classification Search
    CPC .. B01D 17/0205; B03D 1/1412; B03D 1/247; B03D 1/1456; B03D 1/1475;
    (Continued)

(56) References Cited

U.S. PATENT DOCUMENTS 3,738,492 A    6/1973   Trillich
4,424,068 A *  1/1984   McMillan .......... B01D 19/0057
                                                      95/243
(Continued)

FOREIGN PATENT DOCUMENTS

CA    2 626 752 A1    5/2007
CA    2527543         5/2007
(Continued)

OTHER PUBLICATIONS

International Search Report and Written Opinion of PCT Application No. PCT/NO2009/000224 dated Mar. 31, 2010.
(Continued)

*Primary Examiner* — Madeline Gonzalez
(74) *Attorney, Agent, or Firm* — Haugtman Ham, LLP

(57) ABSTRACT

The present invention comprises a process and apparatus for separation of hydrocarbons from hydrocarbon-containing produced water, wherein in stage 1 the hydrocarbon-containing produced water is supplied with a gas-containing component, whereupon a gas- and hydrocarbon-containing produced water mixture is fed to an inlet tube (22, 27) in the center of a tank, whereupon the said mixture is tangentially distributed via at least one nozzle (7) and at least one baffle plate (8.1), whereupon separated hydrocarbons are conveyed to at least one outlet from the tank and cleaned water is conveyed to an outlet (12) from the tank.

11 Claims, 5 Drawing Sheets

Figure 1:
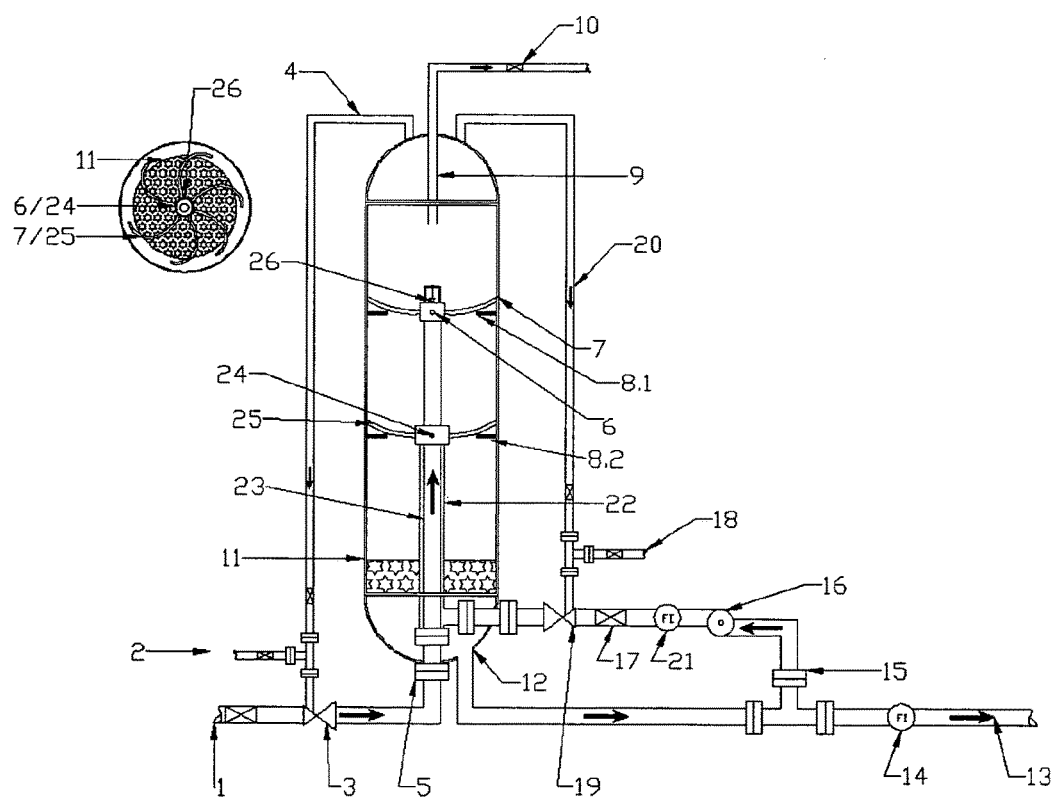

(51) Int. Cl.
*C02F 1/24* (2006.01)
*B03D 1/14* (2006.01)
*B03D 1/24* (2006.01)
*C02F 1/00* (2006.01)
*C02F 101/32* (2006.01)
*C02F 1/20* (2006.01)
*C02F 1/38* (2006.01)
*C02F 1/52* (2006.01)
*C02F 103/10* (2006.01)
*C02F 103/36* (2006.01)

(52) U.S. Cl.
CPC .......... *B03D 1/1456* (2013.01); *B03D 1/247* (2013.01); *C02F 1/006* (2013.01); *C02F 1/24* (2013.01); *C02F 1/40* (2013.01); *B03D 1/1475* (2013.01); *C02F 1/20* (2013.01); *C02F 1/38* (2013.01); *C02F 1/52* (2013.01); *C02F 2101/32* (2013.01); *C02F 2103/10* (2013.01); *C02F 2103/365* (2013.01); *C02F 2201/003* (2013.01); *C02F 2209/40* (2013.01); *C02F 2301/026* (2013.01); *C02F 2301/043* (2013.01); *C02F 2301/08* (2013.01)

(58) Field of Classification Search
CPC .... C02F 1/006; C02F 1/24; C02F 1/40; C02F 2301/026; C02F 2301/08; C02F 2103/365; C02F 2201/003; C02F 2301/043; C02F 1/38; C02F 1/52; C02F 2103/10; C02F 1/20; C02F 2101/32; C02F 2209/40
USPC ....... 210/DIG. 5, 708, 450, 198.1, 151, 188, 210/194, 195.3, 195.4, 196, 197, 198, 210/218, 220, 221.1, 221.2, 252, 255, 210/274, 288, 702–704, 291, 314, 335
See application file for complete search history.

(56) References Cited

U.S. PATENT DOCUMENTS

| | | | |
|---|---|---|---|
| 4,986,903 | A | 1/1991 | Canzoneri et al. |
| 6,383,367 | B1 | 5/2002 | Grotheim |
| 7,144,503 | B2 | 12/2006 | Oserod |
| 7,157,007 | B2 | 1/2007 | Frankiewicz et al. |
| 7,534,354 | B2 | 5/2009 | Oserod |
| 8,043,419 | B2 | 10/2011 | Folkvang |
| 9,808,741 | B2 * | 11/2017 | Folkvang .......... B01D 17/0205 |
| 2004/0035799 | A1 | 2/2004 | Smith et al. |
| 2004/0232053 | A1 | 11/2004 | Serres et al. |
| 2004/0256325 | A1 * | 12/2004 | Frankiewicz ...... B01D 17/0205 210/703 |
| 2009/0294375 | A1 * | 12/2009 | Lange ................ B01D 17/0205 210/703 |
| 2011/0290738 | A1 | 12/2011 | Folkvang |
| 2016/0009569 | A1 | 1/2016 | Folkvang |

FOREIGN PATENT DOCUMENTS

| | | | |
|---|---|---|---|
| CN | 85107973 | | 7/1987 |
| CN | 1055124 | | 10/1991 |
| CN | 201154243 | | 11/2008 |
| DE | 4029211 | | 4/1992 |
| JP | S56129010 | | 10/1981 |
| JP | 2003154204 | | 5/2003 |
| WO | 9965588 | | 12/1999 |
| WO | 2007049245 | | 5/2007 |
| WO | WO 2007049247 | A1 * | 5/2007 ......... B01D 19/0057 |
| WO | 2010080035 | | 7/2010 |

OTHER PUBLICATIONS

Canadian Office Action dated Jun. 28, 2018, issued in corresponding Canadian Patent Application No. 2,961,619, citing the above references.

* cited by examiner

CLEANING OF OLEAGINOUS WATER III

The present invention comprises a process for separation of hydrocarbons from hydrocarbon-containing produced water as well as apparatus for separation of hydrocarbons from hydrocarbon-containing produced water.

BACKGROUND

Globally is the water production associated with the oil & gas production more than three times higher than the oil production. This gives an average water fraction of about 75% of what is produced from the wells. The water percentage continues to increase. About ten years ago was it about 70%. The water fraction increases in proportion to the oil fields being older and decreases in proportion to better methods being developed to handle the reservoir and to new fields being introduced. Simultaneously the environmental conditions are being more strict and more complicated to meet. The challenges for the operators are increasing and the need of better, diminished and more cost effective technologies arises. The costs of water treatment participates in determining how high water content it will be profitable to produce. This will also depend on the oil price.

The purpose of the present invention is to provide a purification system for produced water with the main focus at oil installations onshore and offshore worldwide. Produced water coming up from the well with the well stream is separated from the oil and gas, and then purified and discharged to the sea or reinjected into the reservoir. Produced water is a mixture of formation water, residuals of production chemicals and reinjected water (on installations where this is carried out). The contents and composition of produced water vary from field to field and from well to well within the same field. In addition will also the composition vary over time in one and the same well. Each minute will Norwegian oil platforms treat about 400 m$^3$ water. A constantly more mature Norwegian shelf with less oil and more water has resulted in a strong increase in produced water. In 2007 about 200 million m$^3$ produced water were treated on the Norwegian shelf. About 90 percent of this was discharged to the sea.

SUMMARY OF THE INVENTION

The present invention relates to a process for separation of hydrocarbons from hydrocarbon-containing produced water, wherein in stage 1a gaseous component is supplied to the hydrocarbon-containing produced water, whereupon a gas- and hydrocarbon-containing produced water mixture is fed to an inlet tube (22, 27) in the center of a tank, whereupon the said mixture is tangentially distributed via at least one nozzle (7) and at least one baffle plate (8.1), whereupon separated hydrocarbons are fed to at least one outlet (10) from the tank and purified (treated) water is fed to an outlet (12) from the tank. The present invention comprises further a stage 2 where a fraction of a gas-containing water mixture from outlet (12) is recirculated via a stream (15) and fed to an annulus chamber and further tangentially fed via at least one nozzle (25) and at least one baffle plate (8.2) countercurrently or cocurrently to the descending water mixture from stage 1. Stage 3 in the present invention comprises that the water mixture from stage 1 is fed to at least one separate stage, via at least one separating plate (30) and at least one annulus chamber (28), and is further tangentially distributed via at least one nozzle (32) and at least one baffle plate (8.2). Further in the present invention stage 4 comprises a descending water mixture which is fed over a layer of a packing material (11). In the present invention the stages mentioned above can be carried out in the sequence which is considered as suitable for the purpose of the invention. Further the various stages can be repeated a number of times if it is considered suitable.

One embodiment of carrying out the present invention for separation of hydrocarbons from hydrocarbon-containing produced water comprises stage 1 where the hydrocarbon-containing produced water is supplied with a gas-containing component, whereupon a gas- and hydrocarbon-containing produced water mixture is fed to an inlet tube (22, 27) in the center of a tank, whereupon the said mixture is tangentially distributed via at least one nozzle (7) and at least one baffle plate (8.1); and stage 2 where a fraction of a gas-containing water mixture from outlet (12) is recirculated via a stream (15) and fed to an annulus chamber and further tangentially fed via at least one nozzle and at least one baffle plate countercurrently or cocurrently to the water mixture descending from stage 1, whereupon separated hydrocarbons are fed to at least one outlet from the tank and purified (treated) water is fed to an outlet (12) from the tank.

One embodiment of the present invention comprises a process for separation of hydrocarbons from hydrocarbon-containing produced water, comprising stage 1 where the hydrocarbon-containing produced water is supplied with a gas-containing component, whereupon a gas- and hydrocarbon-containing produced water mixture is fed to an inlet tube (22, 27) in a tank, whereupon the said mixture is tangentially distributed via at least one nozzle (7) and at least one baffle plate (8.1), whereupon separated hydrocarbons are fed to at least one outlet from the tank and purified (treated) water is fed from an outlet (12) from the tank; and stage 2 where a fraction of gas-containing water mixture from outlet (12) is recirculated via a stream (15) and is fed to an annulus chamber (23) and further fed tangentially via at least one nozzle (25) and at least one baffle plate (8.2) countercurrently or cocurrently to a water mixture descending from stage 1; and stage 4 where the descending water mixture is fed over a layer of a packing material (11) and purified (treated) water is conveyed to outlet (12).

One embodiment of the present invention relates to a process for separation of hydrocarbons from hydrocarbon-containing produced water, comprising stage 1 where the hydrocarbon-containing produced water is supplied with a gas-containing component, whereupon a gas- and hydrocarbon-containing produced water mixture is fed to an inlet tube (22, 27) in a tank, whereupon the said mixture is tangentially distributed via at least one nozzle (7) and at least one baffle plate (8.1), whereupon separated hydrocarbons are fed to at least one outlet from the tank; and stage 3 where the water mixture from stage 1 is fed to at least one separate stage, via at least one separation plate (30) and at least one annulus chamber (28), and further tangentially distributed via at least one nozzle (32) and at least one baffle plate (8.2), whereupon separated hydrocarbons are conveyed to at least one outlet (35, 36) from the tank, and purified (treated) water is conveyed to outlet (12) from the tank.

In one embodiment the present invention comprises a process for separation of hydrocarbons from hydrocarbon-containing produced water comprising stage 1 where the hydrocarbon-containing produced water is supplied with a gas-containing component, whereupon a gas- and hydrocarbon-containing produced water mixture is fed to an inlet tube (22, 27) in a tank, whereupon the said mixture is tangentially distributed via at least one nozzle (7) and at least one baffle plate (8.1) whereupon separated hydrocarbons are fed to at least one outlet from the tank, and stage 3 where the water mixture from stage 1 is fed to at least one separate stage, via at least one separation plate (30) and at least one annulus chamber (28), and is further tangentially distributed via at least one nozzle (32) and at least one baffle plate (8.2), and separated hydrocarbons are fed to at least one outlet (35, 36) from the tank; and stage 4 where a descending water mixture is fed over a layer of a packing material (11) and purified (treated) water is fed to an outlet (12) from the tank.

In an embodiment the present process for separation of hydrocarbons from hydrocarbon-containing produced water comprises stage 1 where the hydrocarbon-containing produced water is supplied with a gas-containing component, whereupon a gas- and hydrocarbon-containing produced water mixture is fed to an inlet tube (22, 27) in a tank, whereupon the said mixture is tangentially distributed via at least one nozzle (7) and at least one baffle plate (8.1), whereupon separated hydrocarbons are fed to at least one outlet from the tank; and stage 4 where a descending water mixture is fed over a layer of a packing material, and purified water is fed to an outlet (12) from the tank.

In the present invention, the hydrocarbon-containing produced water is further distributed via at least one branch means (26) in the top portion of the inlet tube (22, 27). A further gas supply (34) is effected in the annulus chamber (28). In the invention described above the gas-containing component is supplied via an extern supply (2) or is recirculated from the top of the tank (4). Further gas supply can be chosen from the group comprising as follows; nitrogen, hydrocarbon (fuel gas), $CO_2$.

Further, an embodiment of the present invention is described where the water mixture from stage 1 is supplied/streams into an annulus chamber and further into an inlet tube prior to tangential distribution via at least one nozzle (32) and at least one baffle plate (8.2) in at least one separate stage.

In an embodiment of the present invention, a flocculant can be added upstream from the inlet tube (22, 27) for better output.

The present invention describes apparatus for separation of hydrocarbons from hydrocarbon-containing produced water, where the apparatus comprises the following:
a pressure tank,
at least one inlet tube (22, 27) in the tank,
at least a further branch means (26) in the top portion of the inlet tube, at least one nozzle (7) and at least one baffle plate (8.1);
at least one outlet (12) from the tank for purified water;
at least one outlet (10, 35, 36) for separated hydrocarbons.

Apparatus according to the present invention further comprises an annulus chamber (23) which encircles the inlet tube (22) and which comprises at least one branch means (24) at least at one level, further comprising at least one nozzle (25) and optionally encircled by a screen means and at least one baffle plate (8.2). The apparatus is further described to comprise at least one separation plate (30) and at least one annulus chamber (28) encircling the inlet tube (27) with at least one branch means (31) at least at one level, comprising at least one nozzle (32) and at least one baffle plate (8.2). A layer comprising a packing material is also described according to the invention.

Apparatus for separation of hydrocarbons from hydrocarbon-containing produced water comprises the following:
a pressure tank,
at least one inlet tube (22, 27) in the tank,
at least one further branch means (26) in the top portion of the inlet tube, at least one nozzle (7) and at least one baffle plate (8.1);
at least one outlet (12) from the tank for purified water;
at least one outlet (10, 35, 36) for separated hydrocarbons;
an annulus chamber (23) encircling the inlet tube (22) and comprising at least a branch means (24) at least at one level, further comprising at least one nozzle (25) and optionally encircled by a screen means and at least one baffle plate (8.2).

Further, the present apparatus for separation of hydrocarbons from hydrocarbon-containing produced water describes the following:
a pressure tank,
at least one inlet tube (22, 27) in the tank,
at least one further branch means (26) in the top portion of the inlet tube, at least one nozzle (7) and at least one baffle plate (8.1);
at least one outlet (12) from the tank for purified water;
at least one outlet (10, 35, 36) for separated hydrocarbons;
an annulus chamber (23) encircling the inlet tube (22) and comprising at least one branch means (24), at least at one level, further comprising at least one nozzle (25) and optionally encircled by a screen means and at least one baffle plate (8.2),
a layer comprising a packing material.

Further, in the present invention it is described apparatus for separation of hydrocarbons from hydrocarbon-containing produced water comprising the following:
a pressure tank,
at least one inlet tube (22, 27) in the tank,
at least a further branch means (26) in the top portion of the inlet tube, at least one nozzle (7), and at least one baffle plate (8.1);
at least one outlet (12) from the tank for purified water;
at least one outlet (10, 35, 36) for separated hydrocarbons;
at least one plate (30) and at least one annulus chamber (30) encircling the inlet tube (27) and having at least one branch means (31), at least at one level, comprising at least one nozzle (32) and at least one baffle plate (8.2.).

Apparatus for separation of hydrocarbons from hydrocarbon-containing produced water according to the invention comprises the following:
a pressure tank,
at least one inlet tube (22, 27) in the tank,
at least a further branch means (26) in the top portion of the inlet tube, at least one nozzle (7), and at least one baffle plate (8.1);
at least one outlet (12) from the tank for purified water;
at least one outlet (10, 35, 36) for separated hydrocarbons;
a layer comprising a packing material.

The present invention comprises the following:
A process for separation of hydrocarbons from hydrocarbon-containing produced water in a three stage process, where
hydrocarbon-containing produced water is supplied with
a gas-containing component whereupon the gas- and hydrocarbon-containing produced water mixture is fed to an inlet tube (22, 27) via the bottom of a tank, whereupon the said mixture is tangentially distributed via at least one nozzle (7);
a gas-containing water mixture is tangentially supplied countercurrently or cocurrently and distributed via at least one nozzle (25);
the descending liquid stream is fed over a layer of packing material (11).

Further, the hydrocarbon-containing produced water is additionally distributed via at least one nozzle means on the top of the inlet tube (26).

The present invention comprises apparatus for separation of hydrocarbons from hydrocarbon-containing produced water, comprising
- a pressure tank
- at least one inlet center tube in the bottom of the tank
- an annulus chamber/tube outside the center tube and having a branch means (24) comprising at least one nozzle packing material (11).

The apparatus according to the invention comprises further distribution means on the top of the center tube (26).

SHORT DESCRIPTION OF THE FIGURES

Figure 2:
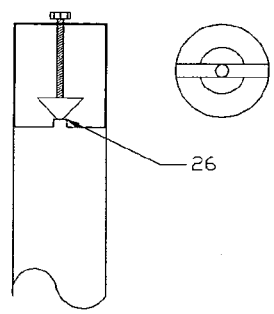
Figure 3:
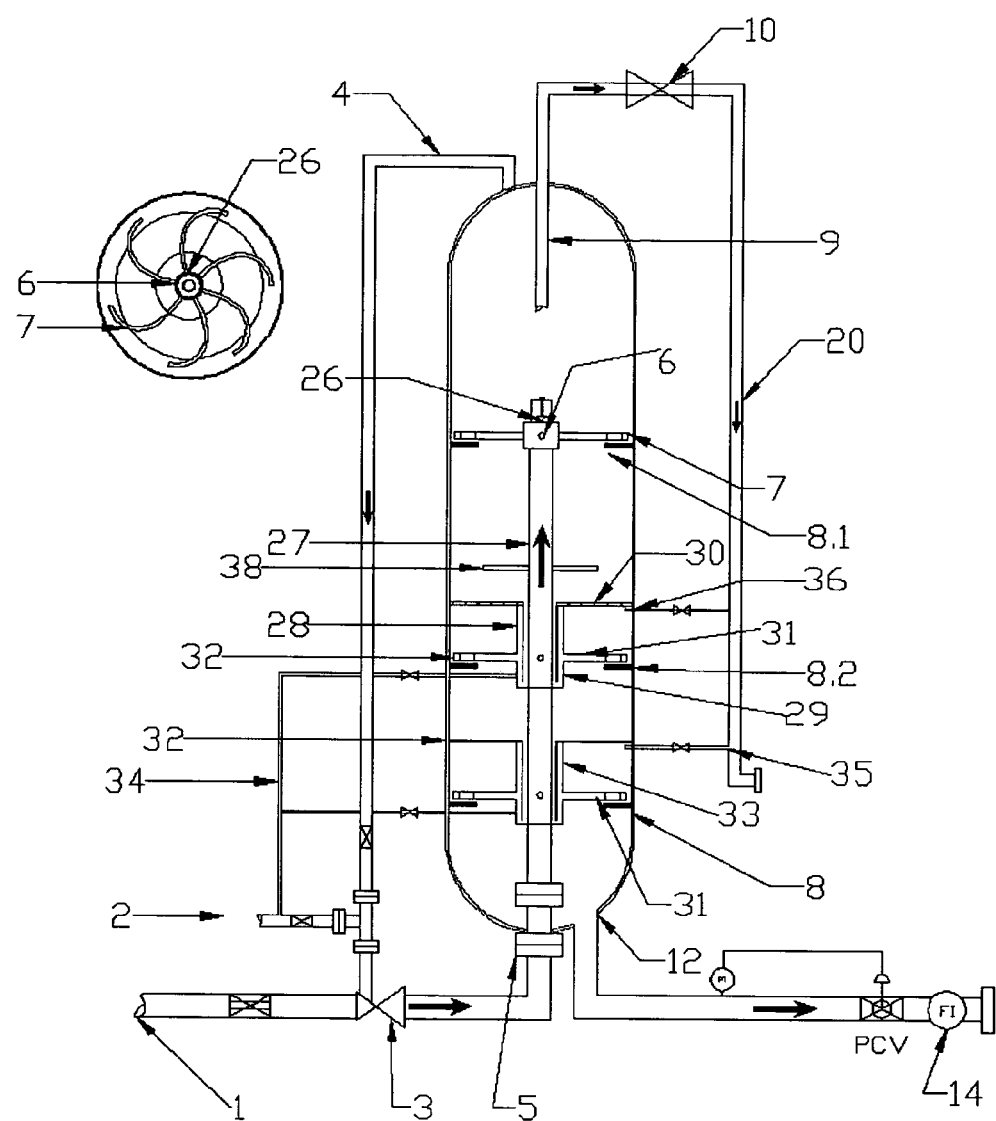
Figure 4:
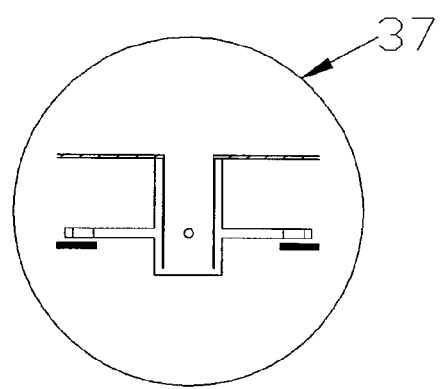
Figure 5:
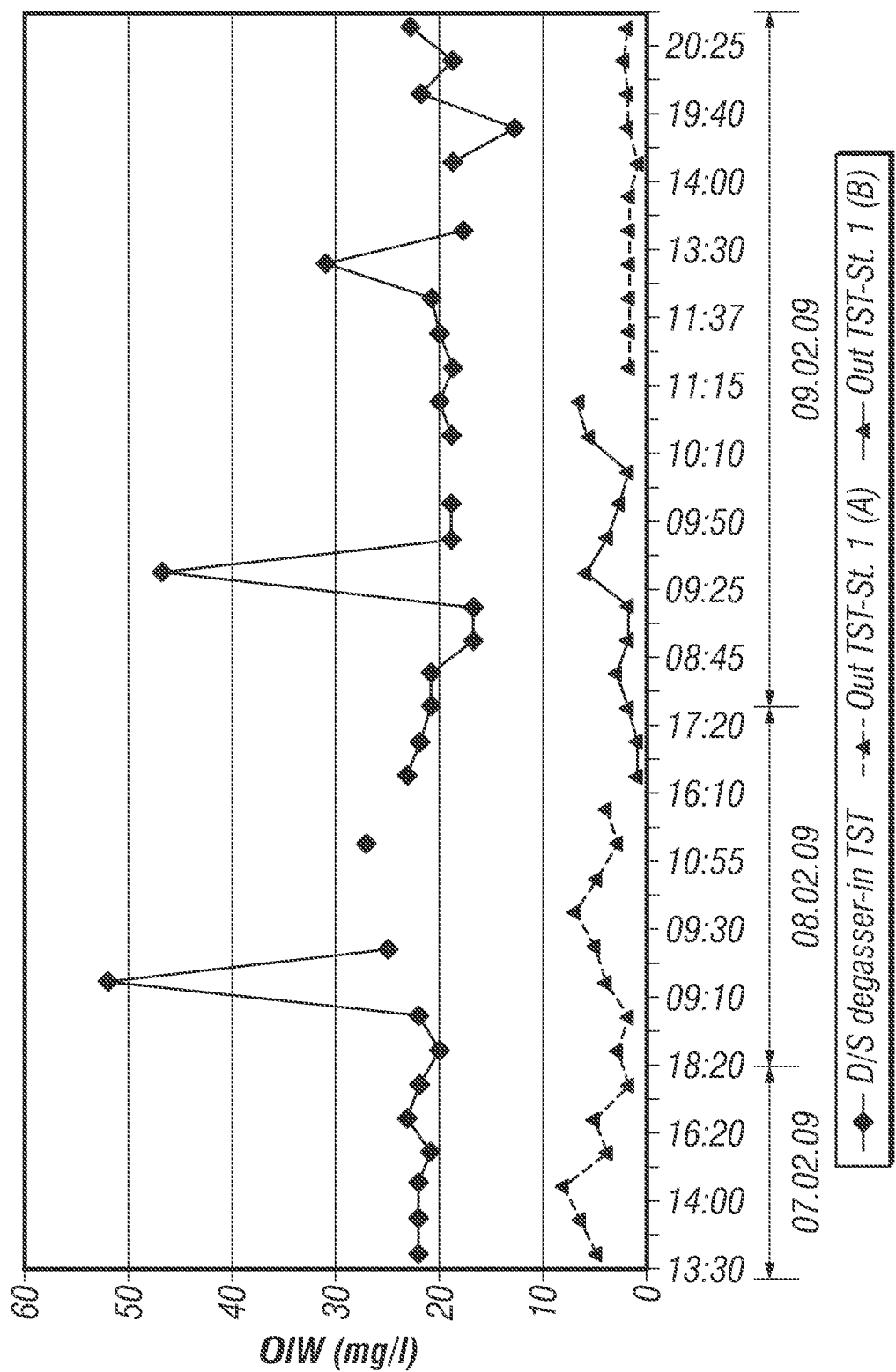

Embodiment of the invention will now be described with reference to the following figures:

FIG. 1 shows a purification system for produced water.
FIG. 2 shows a detail relating to top of nozzle.
FIG. 3 shows a purification system with three stages where stage (37) shown in FIG. 4 is a separate stage which is repeated twice.
FIG. 4 shows a separate stage (37) which can be repeated as many times as desired.
FIG. 5 shows purification of water from a degassing tank with the top curves showing hydrocarbon content in produced water that is fed into the tank and the bottom curves showing the remaining content of hydrocarbons conveyed to an outlet for purified water.

DETAILED DESCRIPTION

The purpose of the present invention can be achieved by the characteristic properties as shown in the following description of the invention.

In FIG. 1, produced water from oil/water separator or other purification equipment as hydrocyclones, degassing tank or similar can be fed in through inlet (1). This water is supplied with gas via gas injection point (2) and is mixed together with incoming water in a gas mixer (3). Alternatively the gas mixer (3) is replaced with an injector (ejector) having incoming water as driving force and which sucks (4) gas from the top of the tank. Typical gas amounts added or circulated is from 0.02 to 0.2 $Sm^3$ per $m^3$ water. This will vary with how much residue gas is present in the incoming water. This mixture of gas and oil-containing water is fed into an internal center tube in the tank via the bottom (5). In the top of the internal center tube a branch means (6) which distributes the water to one or more tubes having outlet nozzles (7) for control of the velocity of gas/water mixture into the tank. These end tangentially along the tank wall. Because of the tangential ending of tubes/nozzles in the tank, a circulation is achieved in the tank and which gives a mixing of water, gas and oil. This results in good contact between gas bubbles and oil droplets. To evade the water from the nozzles not to go directly downwardly in the tank, but be mixed with incoming water/gas, a baffle plate (8) is mounted under each of the inlets. This leads the water over the next inlet so that water wherein great gas bubbles have been released becomes mixed with incoming water for better mixing/contact between gas and the oil droplets. To achieve good mixing also in the center of the tank an adjustable nozzle means (26) is mounted on the top of the inlet tube (the center tube, the feed tube), see FIG. 2. This spreads liquid/gas mixture from the center and outwardly and mixes this with the liquid/gas mixture from the nozzle tubes (7). Gas with adherent oil droplets will rise to the surface of the liquid in the tank and be taken out together with some water in a submerged outlet (9) in the top of the tank. This discharge is controlled by means of a valve (10). The oil/water mixing ratio in this stream is dependent of the valve opening The water with gas bubbles having a minor ascending velocity than the water velocity downwardly in the tank will pass a "bed" of packing materials selected from the group comprising inter alia Raschig rings (11) or similar and to which gas bubbles with adhered oil is attached to, further growing together and therewith achieve a buoyancy which surpass the descending water velocity and float up to the surface. Pure (treated) water which is supplied from this "bed" will pass out in the outlet (12) in the bottom of the tank and further for emission (13) or optionally injection into the reservoir as pressure support. This amount is measured on the flow meter (14). A partial stream (15) from the water outlet from the tank will, by means of a pump (16), be circulated back into the tank. The amount which is recirculated is controlled by means of a valve (17). Gas via an injection point (18) is supplied and is to this stream subsequently fed through a mixer (19) which mixes the gas into the water. Alternatively can gas be sucked from the top of the tank (20) by means of an injector which replaces the mixer (19). Typical gas amount will be 0.05 to 0.3 $Sm^3$ per $m^3$ water. Typical recirculation amount will be 30 to 70% of the maximum design rate for the tank. The amount of recirculation will be read from the flow meter (21). Outside the inner tube (22) is an external tube which in both ends is sealed against the inner tube. Thereby a chamber (23) is formed between these tubes into which the recirculation stream (15) enters. In the top of this chamber is a branch means (24) which distribute the water to one or more tubes having outlet nozzles (25) for control of the velocity of the gas/water mixture into the tank. These end tangentially along the tank wall. To evade that the water from the nozzles not to go directly downwardly in the tank, but be mixed with incoming water/gas, is at least one baffle plate (8.2) mounted below each of the inlets. This leads the water over the next inlet so that water wherein large gas bubbles having been released are being mixed with the incoming water for better mixing/contact between gas and the oil droplets. Alternatively can this stream be distributed tangentially at any distance from the center tube (the inlet tube, the feed tube) with underlying baffle plate and an external vertical wall. Alternatively this stream can also be distributed vertically upwardly from the outlet of the center tube. Alternatively the distributions mentioned above can be directed countercurrently to the described distribution relating to the outlet nozzles (7). In this regard water being separated from the upper nozzle system/mixing supplied with pure water/gas mixture and oil which might follow this water, will again be in contact with gas bubbles which become mixed into the water and therewith achieve a new contact zone for oil/gas which results in a better purification. Alternatively a fractional stream of incoming water can be fed through the same inlet. Water which is fed via the recirculation will follow the water phase out (12) in the bottom of the tank. To increase the size of the oil droplets in the incoming water chemicals can be added, for example flocculants, upstream from the unit.

For increased purification a number of tanks can be connected in series.

Alternatively, each separate nozzle can have an injector which sucks gas via a tube from top of the tank. This tube can be situated outside or inside in the tank.

Alternatively, the inlet tube can extend from the top of the tank and downwardly. Alternatively the water can be purified in a number of stages internally in the tank, in which water from the upper purification stage via nozzles (7) is passed via an annulus chamber (28) between the feed tube (27) and an externally located tube (29) and where the upper chamber is separated by means of plate (30). Before the water enters the said annulus chamber a vortex breaker (38) is present which prevent water from the center of the tank entering the annulus chamber. This is to avoid entrainment of oil from the top of the tank. The water is fed therefrom via the branch means (31) which distributes the water to one or more tubes having outlet nozzles (32) for control of the velocity of gas/water mixture into a novel chamber. These nozzles end tangentially along the tank wall. Alternatively gas can be supplied to this stream via gas addition (34). A typical gas is nitrogen, hydrocarbon gas (fuel gas), $CO_2$, but are not restricted to these. Oil and gas which is separated in this chamber is removed via reject outlet 36 and is combined with reject outlets 20 and 35. Alternatively a number of separate stages as previously described can be installed below each other where in these stages have the similar function.

Therefore, the present invention provides a solution which renders the installation more compact and more effective. Prior art within this field uses a number of purification stages in series. This present solution has a number of purification stages within the same tank. It shall further be specified that the present invention can be carried out with the purification stages mentioned above in the sequence and in the number which is considered suitable. This will reduce the costs, reduce necessary required space and therefore be opportune for more customers. Because of its design will it be simpler to build (fabricate) and also easier to be adapted into existing installations than tanks with for example external tangential inlet.

The present process and apparatus comprise the following:

Process and apparatus for separation of oil/hydrocarbons in liquid state or gaseous state from produced water in oil production, separation of other liquids/gases with specific weight difference and which are not dissolved in each other, consisting of:

a. A vertical pressure tank with different height/diameter ratio dependent on what is to be separated.
b. Where the inlet stream consisting of what is to be separated, is fed into a center tube (inlet tube, feed tube) in the bottom of the tank with the possibility of addition of gas via recirculating from the top of the tank via an ejector (eductor) or additional external gas as for example nitrogen, carbon dioxide, hydrocarbon gas which for example is separated from production separators, but which are not restricted to these.
c. A distribution means in the top of inlet tube above described in item b. and which distribute the feed into one or more feed tubes which end parallel to the tube wall in the upper portion of the tank and at least one baffle plate below these and which directs the stream from at least one distribution tube over the next distribution tube to create a spin (circulation) in the tank and a homogenous stream which gives good mixing of gas/liquid in this portion of the tank.
d. An adjustable nozzle means mounted on the top of the inlet tube described in item b. above. This means spreads the liquid/gas mixture from the center and outwardly in the tank and mixes with the liquid/gas mixture from the nozzle tube described in item c.
e. A tube outside the feed tube described in item c and which is sealed in both ends against the feed tube described in item c and forms an annulus chamber where a recirculated stream from the purified water outlet can be recirculated together with gas added into a mixer or with recirculated gas from the top of the tank via an ejector. Alternatively a portion of the feed stream can be fed into the described annulus tube.
f. Where the described annulus tube has a distribution means as described in item c, but placed lower than distribution tube described in c where the feed stream can be tangentially distributed in any distance from the center tube towards the tank wall directionally controlled cocurrently or countercurrently to the distribution stream described in item c. The baffle plate has an outer vertical wall which is 2 to 10 times higher than the distribution tube by distribution nearer a tank wall. Alternatively the distribution tubes can be directed horizontally upwards.
g. Where purified liquid outlet is in the bottom of the tank.
h. Where downwardly flowing liquid stream passes a "bed" of gas coalescent material (packing material) where small gas bubbles with adherent droplets/particles are built together to large ones and are given buoyancy to rise to the surface.
i. Where gas and oil which has been separated are removed from the top of the tank via a submerged tube at a level of between 5 and 20% of the tank height from the top of the tank where the removed amount is regulated by means of a valve.
j. A gas "pad" in the top of the tank is formed due to the tube described in item i., which is a buffer for recirculation of gas.
k. Where the pressure in the tank is controlled by means of a valve in the outlet tube.

FIG. 5 shows purification of water from a degassing tank where the top curves show hydrocarbon content in produced water which is fed into the tank. In particular, FIG. 5 shows the effect of the process for separation of hydrocarbons from hydrocarbon-containing produced water where the water has been supplied with a gas-containing component, and where the gas- and hydrocarbon-containing produced water mixture has been fed to an inlet tube in the center of a tank. Further, the said mixture has been tangentially distributed via at least one nozzle and at least one baffle plate, and the separated hydrocarbons has been conveyed to an outlet from the tank and purified water has been conveyed to an outlet from the tank. The curves at the bottom show the remaining content of hydrocarbons conveyed to an outlet for purified water.

It is important to notice that further purification stages can be effected in relation to the various stages and the embodiments as described in the foregoing.

When preferred embodiments of the present invention have been described, it will for the person skilled in the art be evident that other embodiments which incorporate the concepts can be used. These and example illustrated in the foregoing are considered as mere example and the factual scope of the invention shall be determined from the following patent claims.

The invention claimed is:

1. An apparatus for separating oil from oil-containing water, comprising:
 a vessel comprising an upper chamber in fluid communication with a lower chamber;
 an inlet tube connected to a gas injection line of the vessel;

an upper nozzle extending outward from the inlet tube into the upper chamber and configured to distribute the oil-containing water and gas tangentially into the upper chamber, the inlet tube extending along a central axis of the vessel;

an upper oil outlet in the upper chamber configured to output oil and gas from the upper chamber; and a lower oil outlet in the lower chamber configured to output oil and gas from the lower chamber.

2. The apparatus of claim 1, further comprising a water outlet in the lower chamber configured to output water from the lower chamber.

3. The apparatus of claim 1, wherein the vessel comprises a separation plate defining the upper chamber and lower chamber.

4. The apparatus of claim 1, further comprising a plurality of upper nozzles.

5. The apparatus of claim 1, further comprising a baffle plate in the upper chamber located under the upper nozzle.

6. The apparatus of claim 1, further comprising a lower nozzle extending from a separation plate into the lower chamber and configured to distribute the oil-containing water and gas tangentially into the lower chamber.

7. The apparatus of claim 6, further comprising a plurality of lower nozzles.

8. The apparatus of claim 6, further comprising a baffle plate in the lower chamber under the lower nozzle.

9. The apparatus of claim 1, wherein the inlet tube extends from the bottom of the vessel.

10. The apparatus of claim 2, further comprising a bed of gas coalescent material in the lower chamber configured such that the water flows through the bed before flowing out the water outlet.

11. The apparatus of claim 1, further comprising a vortex breaker in the lower chamber.

\* \* \* \* \*